United States Patent
Nannen

[11] Patent Number: 5,906,051
[45] Date of Patent: May 25, 1999

[54] HEIGHT ADJUSTABLE ANTI-GOUGING GROUND GUIDE SYSTEM FOR VEGETATION TRIMMER

[76] Inventor: William G. Nannen, 110 W. Main St., Smethport, Pa. 16749

[21] Appl. No.: 09/054,813

[22] Filed: Apr. 3, 1998

[51] Int. Cl.⁶ .............. A01G 3/06; A01D 50/00
[52] U.S. Cl. .............................. 30/276; 30/347
[58] Field of Search .......... 30/276, 347; 56/12.5, 56/12.7

[56] References Cited

U.S. PATENT DOCUMENTS

| | | | |
|---|---|---|---|
| 4,203,212 | 5/1980 | Proulx | 30/276 |
| 4,483,069 | 11/1984 | Moore | 30/276 |
| 4,490,910 | 1/1985 | Mattson et al. | 30/276 |
| 4,575,937 | 3/1986 | McCullough | 30/276 |
| 4,704,848 | 11/1987 | Nannen | 56/17.2 |
| 4,882,843 | 11/1989 | Baba | 30/276 |
| 5,095,688 | 3/1992 | Fabrizio | 56/12.7 |
| 5,109,607 | 5/1992 | Everts | 30/276 |
| 5,136,782 | 8/1992 | Calcinai | 30/276 |
| 5,222,301 | 6/1993 | Sugihara et al. | 30/276 |
| 5,367,862 | 11/1994 | Spear et al. | 56/12.7 |
| 5,402,627 | 4/1995 | Trompler et al. | 56/12.7 |
| 5,623,765 | 4/1997 | Ner-Gaon | 30/276 |
| 5,657,542 | 8/1997 | White, III et al. | 30/276 |
| 5,749,148 | 5/1998 | White et al. | 30/276 |

*Primary Examiner*—Douglas D. Watts
*Attorney, Agent, or Firm*—Simpson, Simpson & Snyder

[57] ABSTRACT

A ground guide system for a trimming head of a powered vegetation trimmer, which may be of the type having a rotatable drum enclosing a spooled trimming cord and a bump feed mechanism on the bottom of the drum, comprises a housing above the drum, a hollow hub mounted within the housing and coupled to the drum for driven rotation therewith, an elongated mounting shaft slidably received within an axially extending sleeve fixed within the housing for upward and downward axially-directed motion, a spring for resiliently biasing the mounting shaft in a downward axial direction, and a ground guide threadably attached to the mounting shaft below the bump feed mechanism for adjusting trimming height. The mounting shaft includes an actuating ring arranged to operatively engage the bump feed mechanism incident to bumping the ground guide against a rigid environmental surface to restore a free end of the trimming cord.

10 Claims, 2 Drawing Sheets

HEIGHT ADJUSTABLE ANTI-GOUGING GROUND GUIDE SYSTEM FOR VEGETATION TRIMMER

BACKGROUND OF THE INVENTION

A. Field of the Invention

The present invention relates generally to automatically powered vegetation trimmers, and more particularly to a novel ground guide system for the head of a powered trimmer which allows height adjustment and, in the case of cord- or filament-type trimmers, enables use of a bump feed mechanism common to such trimmers with or without the ground guide in place.

B. Description of the Prior Art

Automated trimmers of the prior art generally comprise a trimmer head at a distal end of a user handle, and are intended for free multi-directional movement of the trimmer head just above the ground to trim vegetation near obstacles such as trees, fences, and the like. Such automated trimmers commonly include a brush blade or a spool of filament cord mounted in the trimmer head for rotation at high r.p.m., whereby a free end of the cord extends tangentially outward from the spool to serve as a trimming means. The cord-type trimmers very often include a manual bump feed mechanism, for example as taught by U.S. Pat. No. 5,222,301, for advancing additional cord to restore the free end during use. The bump feed mechanism typically extends from the bottom of the trimming head and is actuated by momentarily bumping or impacting same against an environmental surface such as the ground.

A recognized drawback of automated trimmers of the type described above is that the height of the trimming means above the ground is constantly changing, resulting in an uneven cut. This is particularly true where the weight of the trimmer head overburdens the user's physical strength, as often happens with heavy-duty automated trimmers. A related problem is that of gouging, as may occur when the rotating trimming means is inadvertently allowed to contact the ground or other environmental surface.

In order to overcome the problems mentioned above, ground guide systems for powered trimmers have been proposed. U.S. Pat. No. 4,483,069, at FIG. 3 thereof, discloses a trimmer head including a "glide ball" having a smooth, downwardly facing convex surface. The glide ball is threadably mounted on the trimmer head beneath a rotating spool carrying trimming cord by an axially extending stud. The distance between the glide ball and the rotating spool is predetermined by the tightened threaded mating of the glide ball onto the stud, and there is no means provided to secure the glide ball at different threaded positions along the stud to adjust cutting height. Moreover, the structure shown is incompatible with conventional bump feed mechanisms.

U.S. Pat. No. 5,367,862 describes a ground guide attachment for a trimmer head in the form of a saucer-like disk having an upturned circumferential lip and a centrally located mounting post extending upward from the disk for attachment to an existing trimmer head. The mounting post, which is threaded at its remote end, is intended to be inserted through an axial bore in the cord spool and through a receiving hole in an upper support panel of the trimmer head housing, and secured with a nut apparently fixed to an upper support panel of the housing. This construction suffers the same drawbacks mentioned above with respect to U.S. Pat. No. 4,483,069, namely lack of height adjustability and lack of compatibility with conventional bump feed mechanisms.

A different style of ground guide system for automated trimmers is disclosed in U.S. Pat. No. 5,402,627. This patent teaches an elongated support ski having an upwardly extending slotted wall member at one end thereof. The wall member is adjustably fastened to an L-shaped upper member which in turn is fixed to an outer surface of a trimmer head housing. While the disclosed ground guide system is designed for cutting height adjustment, it prevents use of a conventional bump feed mechanism. In addition, the disclosed configuration is susceptible to clogging as cut vegetation accumulates on the wall member.

Another ground guide system offered for sale by Hoffco, Inc. of Richmond, Ind. under the trademark Ground Guard includes a wire surrounding the trimmer head in a generally vertical transverse plane to form side and bottom barriers around the trimmer head. A sliding handle must be operated by the user to raise and lower the wire guard to permit use of a bump feed mechanism. The configuration presents the opportunity for vegetation to accumulate on the wire and plug the trimmer head, and is not height-adjustable.

SUMMARY OF THE INVENTION

Therefore, it is an object of the present invention to provide a ground guide system for a vegetation trimmer which engages the ground to support the trimmer head at a predetermined cutting height during operation of the trimmer.

It is another object of the present invention to provide a ground guide system for a vegetation trimmer which readily permits adjustment of the cutting height.

It is a further object of the present invention to provide a ground guide system for a vegetation trimmer which enables use of a conventional bump feed mechanism of the trimmer without need to displace the ground guide or perform any other operations to accommodate use of the bump feed mechanism.

It is a further object of the present invention to provide a ground guide system for a vegetation trimmer which may be easily removed if desired.

It is a further object of the present invention to provide a ground guide system for a vegetation trimmer which is compact and is not susceptible to clogging.

It is a further object of the present invention to provide a ground guide system for a vegetation trimmer which facilitates side-to-side movement over the ground through non-powered rotation of the ground guide independently of the trimming means.

In view of these and other objects, a head of a vegetation trimmer incorporates a novel ground guide system of the present invention. The trimmer head includes known features, namely a housing fixed to a distal end of a hollow handle enclosing a powered drive shaft, and a rotating trimming means located below housing and operably connected to the drive shaft. The trimming means may be a common cord- or filament-type trimming means having a drum enclosing a spool which carries one or more trimming cords each having a free end extending through a respective opening in the drum for cutting vegetation as the drum and spool rotate at high r.p.m. Where a cord-type trimmer is involved, a further known feature of the trimmer head is a bump feed mechanism extending from the underside of the drum.

Pursuant to the present invention, a ground guide is threadably attached to a lower end of a mounting shaft which extends through a central bore of the trimming means coincident with the rotational axis thereof. An upper portion of the mounting shaft is slidably received within a sleeve fixed within the trimmer head housing, and includes a radial step near its upper end for accommodating a spring acting between the step and an opposing surface of the housing to resiliently bias the mounting shaft in a generally downward axial direction. A toothed hub is coaxially disposed about the sleeve and mounting shaft and rotatably mounted within the housing by a pair of spaced bearings. The hub is fixed at its lower end to the trimming means and is arranged to mate with a bevel gear on the drive shaft to operatively couple the trimming means to the drive shaft. A release mechanism is provided atop the housing to permit removal of the mounting shaft and ground guide. To allow operation of the bump feed mechanism while the ground guide and mounting shaft are in place, an actuating ring is located on the mounting shaft immediately adjacent the bump feed mechanism such that it engages the bump feed mechanism incident to forced upward motion of the mounting shaft.

The ground guide itself is attached to the mounting shaft by way of a threaded bushing to permit independent rotational motion of the ground guide when the trimmer head is slightly tilted.

BRIEF DESCRIPTION OF THE DRAWINGS

The nature and mode of operation of the present invention will now be more fully described in the following detailed description of the preferred embodiments taken with the accompanying drawing figures, in which.

DETAILED DESCRIPTION OF THE PREFERRED EMBODIMENTS

Figure 1:
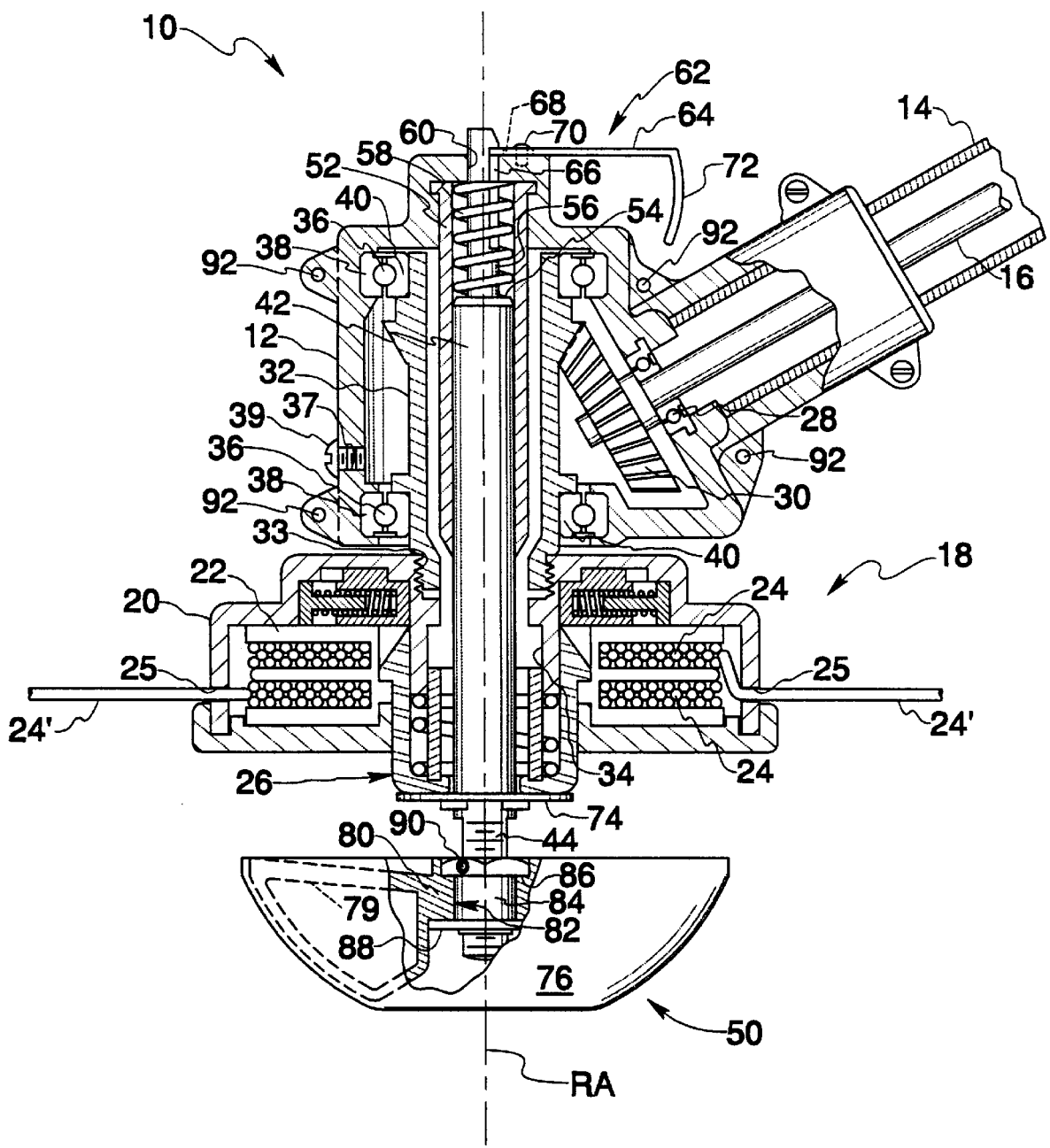
FIG. 1 is a cross-sectional view of a ground guide system formed in accordance with a first embodiment of the present invention.

Attention is initially directed to FIG. 1 of the drawings, wherein a powered vegetation trimmer head incorporating a ground guide system formed in accordance with a first embodiment of the present invention is shown and designated generally by the reference numeral 10. Trimmer head 10 is conventional to the extent that it comprises a housing 12 fixed to a lower end of an elongated hollow handle 14 enclosing a drive shaft 16 which is driven by automatic drive means (not shown) located near an upper end of the handle, and a rotatably driven trimming means 18 located below housing 12. The trimming means 18 shown and described herein is a cord- or filament-type trimming means of a well-known variety having a drum 20 enclosing a spool 22 carrying one or more trimming cords 24, wherein a free end 24' of each trimming cord extends tangentially from the spool through an associated opening 25 in the drum for cutting vegetation as the drum and spool rotate at high r.p.m. A spring-loaded bump feed mechanism 26, also familiar in the art, extends from the bottom of drum 20, whereby such mechanism may be actuated by bumping or impacting it against the ground or another rigid environmental surface to cause the spool to momentarily rotate at a different angular velocity than the drum, thereby causing additional cord to unwind from the spool for restoring free end 24'. While a cord-type trimming means is shown and described herein, it is understood that a brush saw or other rotatable trimming means may be utilized in practicing the present invention.

As may be seen in FIG. 1, a journal end of drive shaft 16 is rotatably seated within a bearing 28 fixed within housing 12 and is operably connected to trimming means 18 by a bevel gear 30 mating with an externally-toothed hub 32 having its bottom end fastened within a central axially-extending bore 34 provided through trimming means 18, such as by left-handed threads 33. Hub 32 is mounted for rotation about a central axis of rotation RA of trimming means 18 relative to housing 12 by upper and lower bearings 36 each having an outer race 38 contacting an inner wall of housing 12 and an inner race 40 contacting an outer surface of the hub. Consequently, as drive shaft 16 is driven, hub 32 and trimming means 18 are caused to rotate. A lubrication port 37 is provided through a wall of housing 12 and is sealed by a threaded plug 39.

An elongated mounting shaft 42 is arranged to extend along rotational axis RA through hub 32 and bore 34. The lower end of mounting shaft 42 includes a threaded portion 44 for attaching a ground guide 50. An upper portion of mounting shaft 42 is slidably received by a sleeve 52 fixed within housing 12 to extend partially and coaxially within hub 32, thus maintaining the mounting shaft in alignment with rotational axis RA. A radially inward step 54 is provided near the upper end of mounting shaft 42 to form a reduced portion 56 of the mounting shaft. A compression spring 58 is arranged about reduced portion 56 inside of sleeve 52, with its lower end engaging step 54 and its upper end engaging an opposing surface of housing 12. Spring 58 functions to resiliently bias mounting shaft 42 in a generally downward axial direction. Reduced portion 56 slidably extends through an opening 60 in a top wall of housing 12, and release means generally designated as 62 is provided for permitting selective removal of the mounting shaft from within the hub and trimming means. In the embodiments described herein, release means 62 comprises a key member 64 having one end normally received within an elongated keyway 66 in the reduced portion 56 of mounting shaft 42 extending parallel to the central rotational axis RA. As will be understood from FIG. 1, key member 64 engages an upper end of keyway 66 to retain the mounting shaft in a reference position, as shown, against the forces of spring 58 and gravity. Key member 64 includes a slot 68 for receiving a fastener 70 to slidably connect the key member to housing 12 in a manner which enables the key member to be pulled out of keyway 66 (to the right in FIG. 1) using an arcuate trigger portion 72 of the key member, thereby permitting selective removal of mounting shaft 42 and attached ground guide 50 as necessary for maintenance or other purposes.

In accordance with the present invention, bump feed mechanism 26 may be operated with ground guide 50 in place. For this purpose, mounting shaft 42 includes an actuating ring 74 located immediately adjacent bump feed mechanism 26 for engaging the bump feed mechanism when mounting shaft 42 is forced in an upward axial direction. Mounting shaft 42 may be forced to slide upward from its reference position relative to housing 12, hub 32, and sleeve 52 until key member 64 engages a lower end of keyway 66, however such forced displacement is countered by spring 58 to return the mounting shaft to its reference position once force is removed. Consequently, ground guide 50 may be momentarily bumped against the ground or other rigid environmental surface to force mounting shaft 42 and actuating ring 74 upward, such that actuating ring 74 operatively engages bump feed mechanism 26 to restore free end 24' of trimming cord 24.

Ground guide 50 preferably includes a smooth, convex surface 76 which slides over and in contact with the ground to maintain trimming means 18 at a constant elevation for producing a level cut which is aesthetically pleasing. In the preferred embodiments described herein, ground guide 50 is mounted on the threaded portion 44 of mounting shaft 42 for both height adjustability and independent rotation about rotational axis RA. Ground guide 50 is preferably hollow, and includes a plurality of angularly spaced, radially extending support members 79 for supporting a central mounting portion 80 characterized by a cylindrical opening 82 therethrough. Mounting portion 80 is slidably mated over an internally threaded bushing 84 between a shoulder portion 86 of the bushing and a removable retaining ring 88 so as to permit free rotation of ground guide 50 about rotational axis RA independently of trimming means 18, a feature which allows for easy back and forth motion across the ground with the trimming head 10 slightly tipped. In turn, bushing 84 is threadably attached to mounting shaft 42 and secured at a chosen distance from trimming means 18 by a set screw 90, whereby the elevation of trimming means 18 may be adjusted.

The first embodiment described above is designed such that housing 12 may be molded in two half-sections from suitable lightweight plastic, or possibly formed in two half-sections from an aluminum alloy. Bearings 36, hub 32, sleeve 52, mounting shaft 42, and spring 58 are installed within one of the half-sections, and then the other half-section is fastened thereto using aligned external fastener holes 92 in each of the half-sections.

Figure 2:
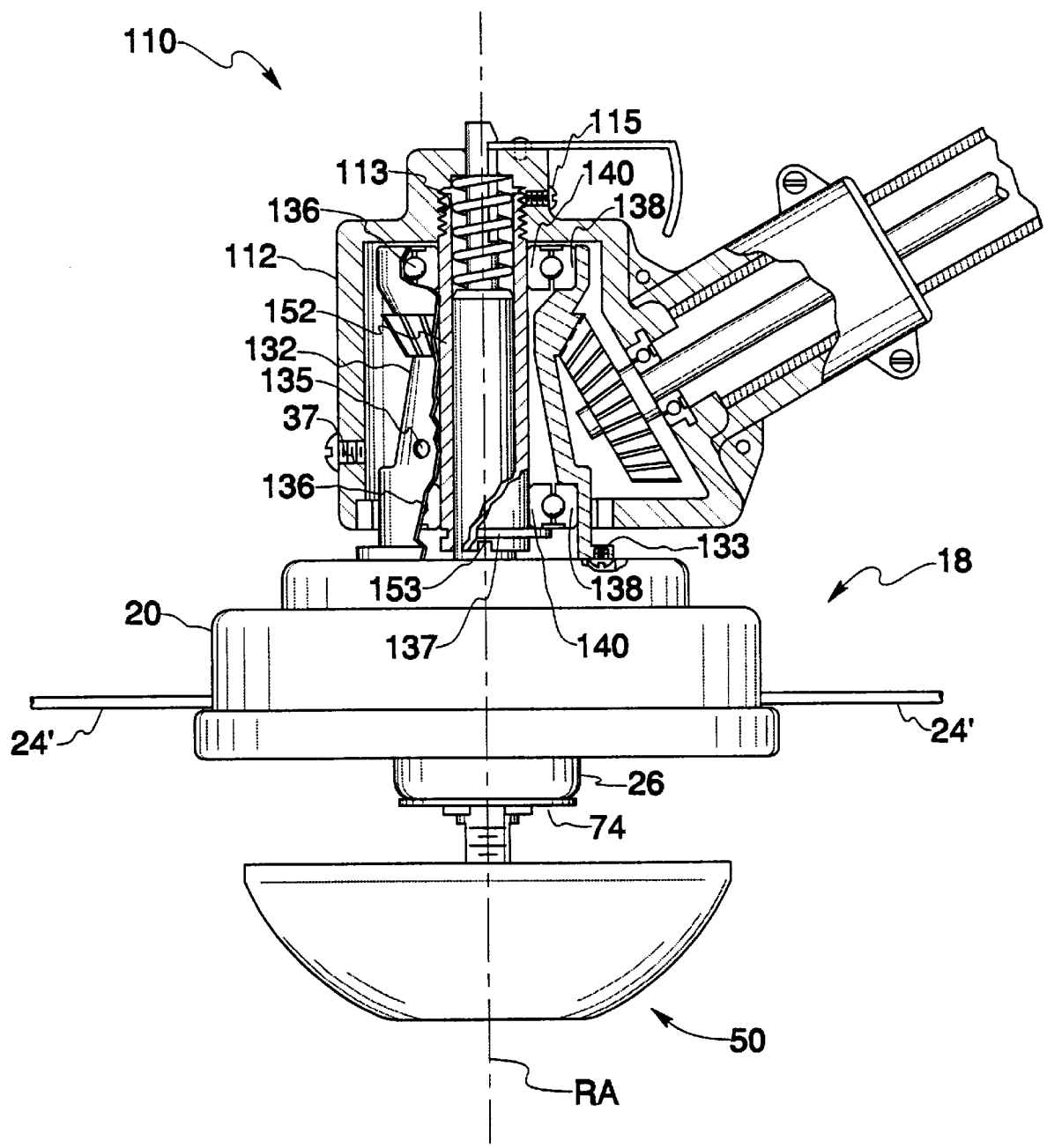
FIG. 2 is a partially cross-sectioned view of a ground guide system formed in accordance with a second embodiment of the present invention.

FIG. 2 depicts a second embodiment 110 of the present invention which is largely similar to the first embodiment described above, but which differs in certain respects now described. In the second embodiment, a hub 132 is rotatably mounted about an axially extending sleeve 152 by upper and lower bearings 136 each having an outer race 138 contacting an inner wall of hub 132 and an inner race 140 contacting an outer surface of sleeve 152; the lower bearing 136 is held by a retaining ring 137 removably located about sleeve 152. Sleeve 152 is externally threaded at its upper end for mating with an internally threaded portion 113 of housing 112, and is secured in place by a set screw 115 arranged to extend through the housing to engage the threaded upper end of the sleeve. The bottom of hub 132 is fastened directly to a top wall of drum 20 by fasteners 133 to cause the drum to rotate with the driven hub. Hub 132 is provided with a hub lubrication port 135 so that lubricant added through housing lubrication port 37 may reach bearings 136.

The embodiment depicted in FIG. 2 is designed such that housing 112 may be molded as a one-piece unit from suitable lightweight plastic, or possibly machined from a single piece of aluminum alloy stock material. Sleeve 152, bearings 136, retaining ring 137, and hub 132 are preassembled and inserted through the bottom opening of housing 112, after which sleeve 152 may be screwed into housing threaded portion 113 with the help of a torque slot 153 in the bottom end of sleeve 152.

What is claimed is:

1. A ground guide system for an automatically powered trimmer having a drive shaft operably connected to rotatable trimming means, said ground guide system comprising:

a housing above said trimming means;

a hollow hub mounted within said housing for rotation about a central axis corresponding to an axis of rotation of said trimming means, said hub being coupled to said drive shaft and said trimming means to impart rotational motion from said drive shaft to said trimming means;

an elongated mounting shaft connected to said housing and arranged to extend through said hub and said trimming means along said central axis, said mounting shaft being movable relative to said trimming means in upward and downward axial directions;

means for resiliently biasing said mounting shaft in said downward axial direction; and a ground guide carried by said mounting shaft below said trimming means.

2. The ground guide system according to claim 1, wherein said trimming means comprises a spooled cord having a free end for cutting vegetation and a bump feed mechanism for unspooling additional cord to selectively restore said free end, and said mounting shaft includes flange means for operatively engaging said bump feed mechanism when said mounting shaft is forced in said upward axial direction by impact of said ground guide against an environmental surface, whereby said bump feed mechanism may be operated with said ground guide in place.

3. The ground guide system according to claim 1, wherein said ground guide is threadably mounted on said mounting shaft to permit adjustment of distance between said trimming means and said ground guide.

4. The ground guide system according to claim 3, wherein said ground guide is mounted on said mounting shaft by a threaded bushing permitting independent rotation of said ground guide relative to said mounting shaft about said central axis.

5. The ground guide system according to claim 1, wherein said mounting shaft is connected to said housing by release means for permitting selective removal of said mounting shaft from within said hub and said trimming means.

6. The ground guide system according to claim 5, wherein said release means comprises a key member having an inner end received within a longitudinally extending keyway provided in said mounting shaft, said key member being connected to said housing for slidable motion into and out of said keyway.

7. The ground guide system according to claim 1, wherein said means for resiliently biasing said mounting shaft in said downward axial direction comprises a spring connected between said housing and said mounting shaft.

8. The ground guide system according to claim 1, wherein said hub is mounted for rotation about said central axis by a plurality of bearings having an inner race contacting an outer surface of said hub and an outer race contacting an inner surface of said housing.

9. The ground guide system according to claim 1, further comprising an elongated sleeve fixed within said housing for slidably receiving said mounting shaft and maintaining said mounting shaft in alignment with said central axis.

10. The ground guide system according to claim 9, wherein said hub is mounted for rotation about said central axis by a plurality of bearings having an inner race contacting an outer surface of said sleeve and an outer race contacting an inner surface of said hub.

* * * * *